United States Patent
Glass

[19]

[11] Patent Number: 6,056,872
[45] Date of Patent: May 2, 2000

[54] MAGNETIC DEVICE FOR THE TREATMENT OF FLUIDS

[75] Inventor: David Saul Glass, Tokyo, Japan

[73] Assignee: The Magnetizer Group, Inc., Fountainville, Pa.

[21] Appl. No.: 09/019,950

[22] Filed: Feb. 6, 1998

[51] Int. Cl.[7] .............................................. B01D 35/06
[52] U.S. Cl. ........................... 210/32; 123/538; 166/66.5
[58] Field of Search ................................. 210/222, 695, 210/223; 123/536, 538; 166/665

[56] References Cited

U.S. PATENT DOCUMENTS

| | | | |
|---|---|---|---|
| Re. 35,689 | 12/1997 | Kulish | 210/222 |
| D. 175,814 | 10/1955 | Wells | D23/207 |
| D. 241,936 | 10/1976 | Rossen | D23/209 |
| D. 242,920 | 1/1977 | Csurgay | D23/207 |
| D. 253,841 | 1/1980 | Sanderson | D34/8 |
| D. 262,306 | 12/1981 | Carpenter | D23/207 |
| D. 262,987 | 2/1982 | Carpenter | D23/207 |
| D. 277,775 | 2/1985 | Moran et al. | D23/207 |
| D. 279,027 | 5/1985 | Weisenbarger et al. | D23/207 |
| D. 289,674 | 5/1987 | Kulish | D23/207 |
| D. 299,266 | 1/1989 | Kulish | D23/207 |
| 1,528,119 | 3/1925 | Ludwig | 24/135 R |
| 2,652,925 | 9/1953 | Vermeiren | 210/222 |
| 2,939,830 | 6/1960 | Green et al. | 204/248 |
| 3,059,910 | 10/1962 | Moriya | 261/72.1 |
| 3,228,878 | 1/1966 | Moody | 210/695 |
| 3,947,533 | 3/1976 | Davis | 264/437 |
| 4,020,590 | 5/1977 | Davis | 47/1.3 |
| 4,146,479 | 3/1979 | Brown | 210/222 |
| 4,153,559 | 5/1979 | Sanderson | 210/222 |
| 4,210,535 | 7/1980 | Risk | 210/222 |
| 4,367,143 | 1/1983 | Carpenter | 210/222 |
| 4,372,852 | 2/1983 | Kovacs | 210/222 |
| 4,568,901 | 2/1986 | Adam | 335/305 |
| 4,605,498 | 8/1986 | Kulish | 210/222 |
| 5,024,759 | 6/1991 | McGrath et al. | 210/222 |
| 5,030,344 | 7/1991 | Ambrose | 210/222 |
| 5,037,546 | 8/1991 | Janczak et al. | 210/222 |
| 5,118,416 | 6/1992 | Janczak et al. | 210/222 |
| 5,122,277 | 6/1992 | Jones | 210/695 |
| 5,124,045 | 6/1992 | Janczak et al. | 210/695 |
| 5,161,512 | 11/1992 | Adam et al. | 123/538 |
| 5,227,683 | 7/1993 | Clair | 310/11 |
| 5,269,915 | 12/1993 | Clair | 210/222 |
| 5,269,916 | 12/1993 | Clair | 210/222 |
| 5,366,623 | 11/1994 | Clair | 210/222 |
| 5,637,226 | 6/1997 | Adam et al. | 210/695 |

*Primary Examiner*—David A. Reifsnyder
*Attorney, Agent, or Firm*—Dann, Dorfman, Herrell and Skillman; Stephen H. Eland

[57] ABSTRACT

A device for the magnetic treatment of fluids such as gases or liquids, wherein such device includes a plurality of magnets for imparting a magnetic field is arranged peripherally about a pipe or other fluid conduit within which is a flowing fluid. The device utilizes a plurality of magnets with different magnetic field strengths for varying the field flux along the length of the pipe or other fluid conduit.

10 Claims, 8 Drawing Sheets

MAGNETIC DEVICE FOR THE TREATMENT OF FLUIDS

BACKGROUND OF THE INVENTION

The present invention relates to a device for the magnetic treatment of fluids such as gases or liquids flowing in a conduit, wherein such device includes a plurality of magnets for imparting a magnetic field of like polarity to the fluid where said magnets are arranged peripherally about a pipe or other fluid conduit within which is a flowing fluid.

Calcium carbonate and other mineral compounds which contain crystal forming materials such as calcium, sodium, and magnesium are often naturally abundant in public water supplies (municipal water supply sources, wells, industrial water supply sources, etc.). These crystal forming materials are prone to accumulate on the interior pipe walls and to form deposits and scale which over time, build up in sufficient amounts to restrict water flow. Iron or other ferrous pipe is prone to rust or corrosion which weakens the pipe. Algae is also prone to adhere to pipe surfaces; the algae multiplies and forms a thick slime to protect itself which reduces fluid flow, and at the same time induces microbiological corrosion which eats through the pipe wall. These three effects—scaling, corrosion, and algae growth—lower the flow rate and efficiency of pipes, and may cause the pipes to leak and even burst. These three effects, particularly those which cause a buildup on a pipe wall also reduce thermal transfer characteristics of the pipe or other fluid conduit (such as plates in a plate type heat exchanger, or either the interior or exterior of tubes in a shell and tube type heat exchanger) which is particularly detrimental in heat exchangers and other hydronic equipment.

Oil well pumps and the steel pipe or tubing which carries crude oil to the surface are normally susceptible to scaling, corrosion, and algaes, because of the large amount of high-mineral-content water that normally accompanies the crude oil. As a result, the pumps and tubing become restricted and weakened so that they pump and carry less oil, leak, and even burst. Also, many crude oil deposits are high in paraffin, causing heavy "paraffining" of the pumps and well tubing, which restricts the pumps and tubing, eventually stopping the flow of crude oil from the well.

It is known to use chemicals, usually acids and expensive biocides, to prevent, dissolve or remove these materials from the pipes. However, these are not always effective, the chemicals may be toxic or expensive and frequently these chemicals provide a long term operating expense as they must be continuously added to the fluid.

Magnetic devices are known to be useful for preventing scaling, corrosion and algae growth in pipes. Magnetic devices have also been useful for improving the fuel consumption of, and reducing the undesirable emissions of engines, i.e., internal combustion, as well as jet propulsion. Such undesirable emissions include for example, HC, NOx, CO and other undesirable byproducts of incomplete combustion, as well as soot, carbon and varnish buildup in the same. Similar benefits are also realized when magnetic devices are used to treat fuels being supplied to boilers, furnaces, and other such devices wherein hydrocarbon fuels are used. Generally these magnetic devices comprise a plurality of magnets spaced axially along the pipes. Also known are magnetic devices which are integrated into a pipe or otherwise are integrated into the structure of the device. Three different arrangements of these magnets are generally known:

In a first arrangement, longitudinal magnets, i.e., 'bar' magnets are used. These magnets are positioned longitudinally along the direction of flow with respect to the pipe or conduit. Such for example is shown in U.S. Pat. No. 4,210,535 to Risk, U.S. Pat. No. 4,367,143 to Carpenter, and U.S. Pat. No. 4,153,559 to Sanderson.

In a second arrangement, magnets are oriented with opposite poles or 'unlike' poles directed with respect to the interior of a pipe or conduit. Such for example are illustrated in U.S. Pat. Nos. 5,227,683 and 5,269,916, both to Clair which illustrates a magnet wherein both north "N" and south "S" poles are directed towards the interior of the pipe or conduit.

In a third arrangement, magnets are all oriented with same poles, 'like' or common poles (either all 'north' or all 'south' poles) directed with respect to interior the pipe or conduit. Such for example is shown in U.S. Pat. No. 5,637,226 to Adam, U.S. Pat. No. 5,161,512 to Adam, U.S. Pat. No. 4,568,901 to Adam, U.S. Pat. No. 4,146,479 to Brown, U.S. Pat. No. 4,372,852 to Kovacs as well as U.S. Pat. No. 4,605,498 to Kulish, all of which illustrate the benefits of such magnet arrangements for treating liquids. Further examples include those shown in U.S. Pat. Nos. 3,947,544 and 4,020,590, both to Davis, U.S. Pat. No. 5,122,277 to Jones, U.S. Pat. No. 5,030,344 to Ambrose, and U.S. Pat. No. 5,024,759 to McGrath which describe benefits of using same pole treatment in horticultural and metal treatment related processes.

Faraday's law provides that an electrical current is generated in a conductor when a conductor moves through magnetic flux lines of a magnetic field, and, that the strength of the current is directly related to the angle of intersection of the moving conductor with the magnetic flux lines. The strength of the current is strongest, when the angle of intersection of the moving conductor with flux lines is perpendicular (90°), and, the strength of the current is essentially zero when the moving conductor is parallel to the flux lines, i.e., when there is no angle of intersection of the moving conductor with flux lines (0°). This effect is described in known texts, including *Physics—A General Introduction* ($2^{nd}$ Ed), Alan Van Heuvelen, Harper Collins—Publishers at Chapter 28, titled "Induced EMF".

In fluids flowing through conduits (i.e., pipes and tubes) the fluid acts as a moving conductor. Introducing a magnetic flux into the flowing fluid will generate electrical currents and ionize some of the molecules of the fluid, as well as of any dissolved and suspended solids. In accordance with Faraday's law, the more perpendicular these magnetic flux lines are in respect to the flowing fluid, the more effective the imparted magnetic treatment to the fluid will be. The reverse is also true as the more oblique the magnetic flux lines are in respect to the flowing fluid, the less effective the imparted magnetic treatment to the fluid will be.

U.S. Pat. Nos. 3,947,544 and 4,020,590 to Albert Roy Davis were based on the discovery that North and South Pole magnetic fields have different and opposite effects on organic substances (seeds) and inorganic substances (metal alloys). This principle was also explained in regard to the different effects of North and South Pole magnetic fields on living organisms in the book "Magnetism and It's Effect On The Living System" by Albert Roy Davis and Walter C. Rawls, first published in 1974. In this writing it is further explained that North and South Pole magnetic fields impart opposite spins to electrons which can be easily seen by placing the different poles close to a black and white television screen. It can be deduced from this that there may be a different effect of North and South Poles on the molecular components of fluids and any dissolved or suspended materials which may be carried in fluids.

U.S. Patent prior art of the aforementioned third type of arrangement (plural magnets all oriented with same pole directed to the interior of the conduit) may take advantage of the different effects of North and South Pole magnetic fields at the molecular level. In some examples of prior art South Pole magnetic flux is mentioned as the most advantageous for the treatment of fluids in a conduit."

Two shortcomings of same pole devices that utilize at least two magnets mounted in opposing fashion about the periphery of a pipe or conduit occur as the like polarity magnetic fields approach the center of the conduit. One shortcoming is a progressive decrease in the effective application of Faraday's law to the fluid. The other shortcoming is progressive and extraordinary decrease in the strength of the single pole magnetic field that contacts the molecular components of the fluid and any dissolved or suspended substances that are carried by the fluid. These shortcomings are noteworthy because as per Albert Roy Davis a single polarity magnetic field, north or south, may be intentionally selected and applied for different and specific beneficial aspects of fluid treatment.

The shortcomings discussed above occur because, as the like pole magnetic flux lines approach each other inside the conduit, they naturally repel one another. The direction of the magnetic flux lines becomes progressively more oblique to the flow of the fluid, creating progressively decreasing angles of intersection with the fluid from 90° (lessening the application of Faraday's Law) and ultimately parallel or 0° (no application of Faraday's Law) usually in the region at or near the center of the conduit or pipe. At the same time the repelling same polarity fields create a counter directional push back away from the center of the conduit, which tends to extraordinarily weaken the net magnetic field in regions at and near the center of the pipe or conduit. The result is a "dead zone" of negligible or no magnetic treatment usually at or near the center of the pipe or conduit where any magnetic flux lines are substantially parallel to the direction of fluid flow and are at an extraordinarily low strength.

Attempts have been made to overcome certain deficiencies in the art of magnetic conditioning of fluids. Many of the described prior art devices provide sets of magnets which are spaced about the periphery of a conduit having their "south" poles facing the interior of the pipe. This use of magnets may provide good flux into the conduit, but as mentioned above at or near the center axis of the conduit the flux lines are deflected from each other due to their like polarity.

Other described prior art provide methods and means to increase or enhance the ordinary strength of magnetic flux to boost the penetration into a pipe or conduit. Some examples of these are disclosed in U.S. Pat. No. 5,122,777 to Jones which discusses a 'diverter band' which ostensibly increases the strength of the magnet in a South pole only treatment process. Also interesting to note is a similar attempt to increase the ordinary strength of magnetic flux in an arrangement of magnets spaced around a pipe using different poles (North and South). U.S. Pat. Nos. 5,227,683, 5,269,915 and 5,366,623 to Clair describe various configurations of magnets, pole piece elements and concentrator elements intended to be magnetic power boosters for their associated magnets. However Clair's devices aid to effectively increase the magnetic field strength being directed to the interior of a pipe or conduit but do not change the arrangement of magnetic flux lines inside the pipe or conduit.

In arrangements of plural magnets with opposing like poles the "dead zone" of negligible or no magnetic treatment at or near the center of the pipe or conduit is not overcome by increasing or enhancing the ordinary strength of the magnets as the fields are still deflected from each other due to their like polarity. Furthermore, the extraordinary low strength of the magnetic field in and near the "dead zone" may be exacerbated by increasing or enhancing the ordinary strength of the magnets because the counter directional push back away from the center of the conduit may also be increased.

Accordingly there is a need in the art for an apparatus and process for the improved magnetic treatment of flowing fluids in a conduit which overcomes the shortcomings of the art which are denoted above.

OBJECTS OF THE INVENTION

It is among the object of the invention to provide an apparatus and process for the improved magnetic treatment of flowing fluids in a conduit which overcomes the shortcomings of the art which are denoted above.

Further objects and advantages of the invention will become apparent from a study of the following description and the accompanying drawings. Throughout the drawings like numbers are used for common functional elements.

DESCRIPTION OF THE INVENTION AND OF PREFERRED EMBODIMENTS

In an aspect of the invention there is provided an apparatus for the magnetic treatment of flowing fluids (gases, liquids) through a conduit (pipe, tube) which produces at least one magnetic field having non-symmetrical flux lines with respect to the flowing fluid.

In a second aspect of the invention there is provided a process and an apparatus for the same pole magnetic treatment of flowing fluids (liquids, gases) in a conduit or pipe.

In a further aspect of the invention there is provided an apparatus and a process for maximizing the magnetic treatment of a flowing fluid within a conduit by a plurality of magnets.

In a yet further aspect of the invention there is provided a process for the magnetic treatment of flowing liquids through a conduit (pipe, tube) which produces a non-symmetrical magnetic field with flux lines perpendicular to the direction of fluid flow, and which improves the magnetic treatment of the fluid.

In a still further aspect of the invention there is provided a process and an apparatus for the same pole magnetic treatment of flowing fluids (liquids, gases) in a conduit or pipe having a longitudinal or center axis, wherein the apparatus comprises at least two magnets which are mounted at or near the circumference of the conduit or pipe, wherein the two or more magnets have like poles directed into the interior of the pipe or conduit, wherein the two or more magnets introduce a magnetic field into the interior of the pipe or conduit, wherein the flux lines of the magnetic field are non-symmetrical with respect to the longitudinal or center axis of the conduit or pipe.

In a yet further aspect of the invention there is provided an apparatus for the same pole magnetic treatment of flowing fluids (liquids, gases) in a conduit or pipe wherein the apparatus comprises at least two magnets which are mounted at or near the circumference of the conduit or pipe, wherein the two or more magnets have like poles directed into the interior of the pipe or conduit, wherein the two or more magnets introduce a magnetic field into the interior of the pipe or conduit of a single magnetic polarity which maximizes the presence of flux lines perpendicular to the fluid passing through the field.

Generally the present invention provides a conduit (10) having a section thereof surrounded by at least one group of permanent magnets or electromagnets which are arranged about the exterior periphery (outer wall) of the conduit. The conduit has a center axis which extends along the conduit's length. The conduit can be made of any ferrous (iron, steel) or non-ferrous (copper, brass, plastic, polymer i.e., PVC, polybutylene, etc.) material. The conduit is preferably a pipe having a generally circular cross section.

In the following figures, magnetic field emanating from a magentic source, viz., magnet are depicted by flux lines and are indicated by references beginning with the letters "FL".

Figure 1:
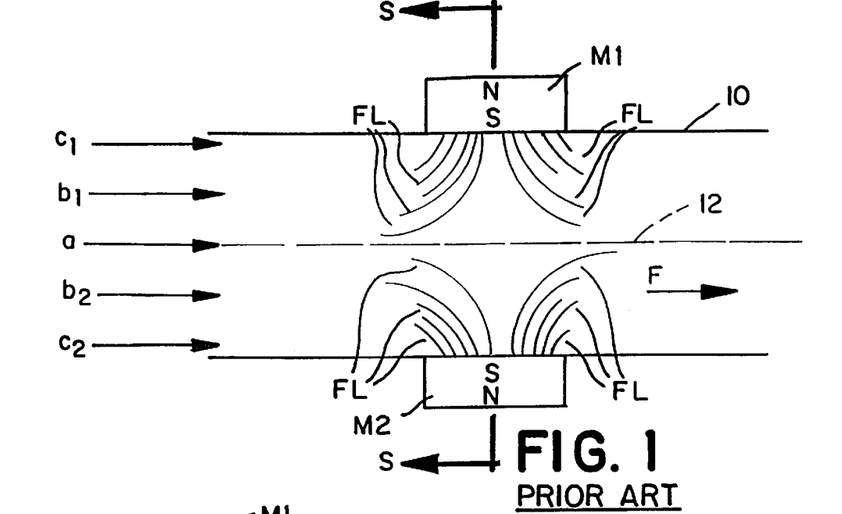
FIG. 1 shows a side cutaway schematic view of a like pole magnetic treatment device according to the prior art. This figure further shows magnetic flux lines from opposing magnets and the flow profile of a liquid flying through said conduit in direction of the labelled arrow (F).

FIG. 1 illustrates a magnetic conditioning device according to the prior art. Therein is disclosed a conduit (10) having inner wall, an outer wall and a center axis (12) through which flows a liquid in the direction of the labelled arrow (F). Also schematically indicated by a series of flow vectors representing flow velocity according to certain locations of the fluid, i.e., a liquid or gas relative to the center axis (12) and the inner walls of the conduit (10). With respect to FIG. 1 (as in following figures) vector "a" indicates the region of fluid flow which is coincident with the center axis (12). The next outward, i.e., more proximate to the conduit walls, are indicated by the flow vectors "b1" and "b2". The next outward, and proximate to the inner wall of the conduit (10) are the flow vectors "c1" and "c2". Further with respect to FIG. 1, are depicted two magnets which impart a magnetic field which extend into the fluid flowing through the conduit (10). These magnets are intended to include pole faces "north" and "south" (indicated as "N" and "S") and are located on the exterior periphery of conduit (10). These magnets are placed such that they are approximately coplanar and substantially perpendicular to the center axis (12) of the conduit. As indicated here, the magnets are oriented at a 180° interval with respect to each other, although they may be oriented at a different radial separation, and it is also foreseen, that more than two magnets may be used. The magnets impart a magnetic field depicted by the flux lines (FL). The characteristics (direction, strength) of a magnetic field is conventionally discussed in terms of "flux lines" as herein. As may be seen from FIG. 1, the flux lines are understood to represent the magnetic field emanating from a corresponding magnet. In viewing these flux lines in conjunction with the placement of the flow vectors, it can be seen that the portions of the flowing liquid coincident with flow vector c1, c2 will pass through the highest flux density as at this region the flux lines are perpendicular (at the wall of the conduit) or nearly perpendicular as in this region of the conduit. Due to the perpendicularity or near-perpendicularity of the magnetic flux lines, and the exposure to the higher flux density of the portions of the flowing liquid coincident with flow vectors 'c1', 'c2' will be imparted with the greatest amount of magnetic conditioning. In further view of FIG. 1, the flow of the liquid corresponding to flow vectors 'b1', 'b2' pass through a respectively reduced magnetic flux density and are imparted with lesser magnetic conditioning. This is due to the fact that at this region of fluid flow, the magnetic flux lines are more obtuse, viz., less perpendicular, with respect to the direction of the flowing liquid. This reduction in perpendicularity also results in a reduction in the efficacy of the magnetic conditioning imparted on this region of fluid corresponding to flow vectors b1, b2 as would be understood from Faraday's law. The liquid flowing and generally coincident with flow vector 'a' passes through the weakest flux density provided by the magnets M1, M2 and are provided with the least amount or with no magnetic conditioning. In this region, reduced magnetic conditioning occurs as the magnetic flux lines are parallel or nearly parallel with respect to the direction of fluid flow, and at the lowest density of magnetic flux. It is also possible that no effective magnetic conditioning occurs in this region of flow corresponding to flow vector a, particularly in the case where magnets, M1 and M2 are weak or the flux density is particularly difficult to penetrate into the conduit (such as in the case of a ferromagnetic pipe).

Figure 1A:
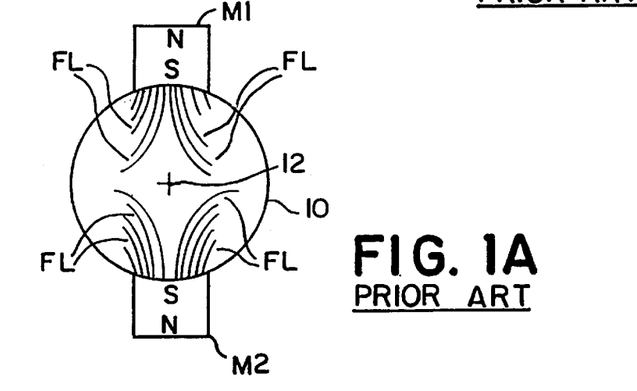
FIG. 1A illustrates an end view of FIG. 1.

As will be appreciated from an inspection of FIG. 1, the magnetic flux lines introduced into the interior of the pipe by the magnets M1 and M2 are symmetrical about the center axis (12), as the magnetic flux lines emanating from magnets M1 and M2, which are equal in strength, emanate similar magnetic fields with similar magnetic flux lines albeit extending in an opposite direction as M1 and M2 are mounted opposite from each other on the external circumference of the conduit (10). This is more clearly depicted on FIG. 1A which represents a cross sectional view of the apparatus of FIG. 1, taken at lines s—s of FIG. 1. As may be seen, the magnetic flux lines (FL) emanating from magnets M1 and M2 are symmetrical about the center axis (12).

In accordance with one aspect of the present invention, there is provided an apparatus for the same pole magnetic treatment of flowing fluids (liquids, gases) in a conduit or pipe having a longitudinal or center axis, wherein the apparatus comprises at least two magnets which are radially mounted at or near the circumference of the conduit or pipe, wherein the two or more magnets have like poles directed into the interior of the pipe or conduit, wherein the two or more magnets introduce a magnetic field into the interior of the pipe or conduit, wherein the flux lines of the magnetic field are non-symmetrical with respect to the longitudinal or center axis of the conduit or pipe.

Figure 2:
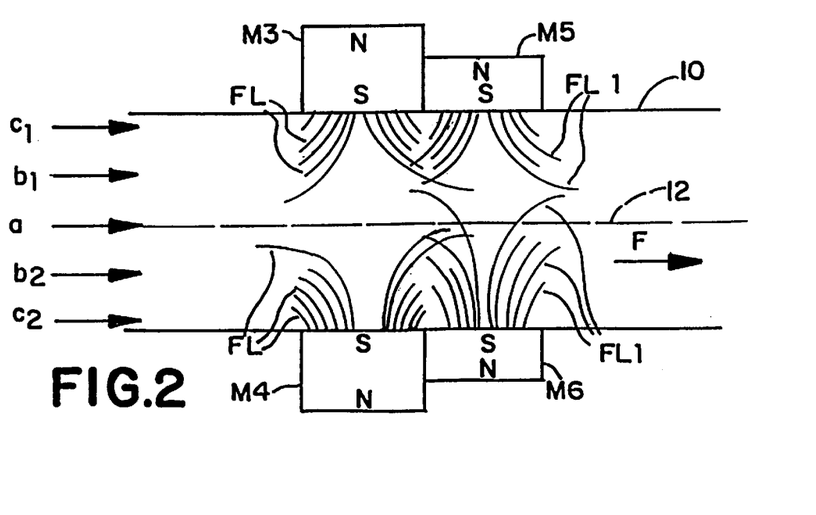
FIG. 2 illustrates a first embodiment of a like pole magnetic treatment device according to the present invention in a schematic sideview.

Turning now to FIG. 2, therein is depicted a first embodiment of the apparatus according to the present invention wherein two sets of magnets are used to provide a magnetic field in the interior of a pipe which is non-symmetrical with respect to the longitudinal or center axis of the conduit or pipe. In FIG. 2, there is depicted a first set of magnets, M3 and M4, and a second set of magnets, M5 and M6. Each of these magnets have respective north and south magnetic poles with their south "S" pole directed inwardly towards the center axis (12) of the conduit (10). Magnets M3, M4, M5 and M6 are positioned about the exterior peripheral portion of the conduit (10). Magnets M3 and M4 are mounted with respect to each other in a coplanar orientation and substantially perpendicular to the center axis (12) of the conduit (10). In a similar manner, magnets M5 and M6 are likewise mounted in a coplanar fashion and substantially perpendicular to the center axis (12).

Turning now in detail to the depiction of FIG. 2, magnets M3 and M4 have equal magnetic field strengths relative to each other. Such is demonstrated by the flux lines (FL) illustrated on FIG. 2 which are substantially symmetric about center axis (12), and similar to the arrangement depicted on FIG. 1. According to the present invention, however, there is provided a second set of magnets, M5, M6, which are two (or more) magnets having different magnetic strengths relative to each other. As may be seen from FIG. 2, the magnetic density imparted by M5 is weaker than that imparted by M6 with the concomitant result that the flux lines imparted by M6 extend further from the peripheral wall of the conduit (10) than the flux lines of M5. This results in a non-symmetrical magnetic flux pattern with respect to the center axis (12), and an offset from the center axis (12).

As may be seen, with respect to liquid traveling along flow vector a, the fluid (which may be a gas or a liquid) passing approximately along the center axis of the conduit will have little or only slight degree of magnetic conditioning imparted by magnets M3, M4 as their flux lines are nearly or parallel to the direction of fluid flow at this region of the conduit (10). However, as the liquid flows thereafter into the region between magnets M5 and M6, the liquid will pass through the magnetic flux imparted by M6 and is depicted by flux lines (FL1). With respect now to the liquid flowing generally along flow vector b1, as the liquid flows through the magnetic flux by magnet M3 and thereafter by magnet M5 as depicted by flux lines (FL), (FL1), respectively. With regard now to the liquid flowing generally in the direction depicted by flow vector b2, the flowing liquid is treated by the magnetic flux imparted by magnet M4 and the pronounced flux imparted by magnet M6, depicted by flux lines (FL) and (FL1) respectively. Increased magnetic treatment is imparted to the flowing liquid due to the more perpendicular orientation of the flux lines with respect to the direction of the flowing liquid. Finally with respect to fluid flowing along fluid vectors c1, c2, as these pass closest to the inner wall of the conduit (10), they will undergo magnetic conditioning as they pass closest to the poles of M3, M4, M5 and M6. At this region, the fluid flowing along fluid vectors c1, c2 are exposed to magnetic flux lines which are nearly perpendicular or perpendicular with respect to the direction of fluid flow.

As may be seen from the description above with respect to FIG. 2, unlike the prior art arrangement illustrated in FIG. 1, all of the liquid passing through the conduit (10) is subjected to magnetic conditioning and has increased exposure to non-parallel magnetic flux lines. This is particularly important in view of the little or no magnetic conditioning which is provided along the center axis as depicted on FIG. 1. In accordance with the present invention, and particularly the embodiment according to FIG. 2, the use of at least one set of magnets having different magnetic strengths tends to "shift" the magnetic fields exerted by the two (or more) magnets in such a set so that the magnetic field exerted is not symmetrical about the center axis of fluid flow within the conduit. As a result of such an arrangement, fluid flowing through every region of the conduit passes through magnetic flux lines; which is in contrast to the prior art particularly as depicted on FIG. 1 wherein the fluid passing along flow vector a underwent little or no magnetic conditioning. According to the present invention, there are present at least two sets of magnets which have two or more magnets in each set; each set of magnets are positioned in a common plane on the periphery of the conduit, or may be positioned on a common plane within the conduit walls; wherein the magnetic flux lines which are exerted by all of the magnets in at least one of the magnet sets exert a magnetic flux profile in the said common plane of the magnet set which is non-symmetrical with respect to the center axis of the conduit.

Figure 3:
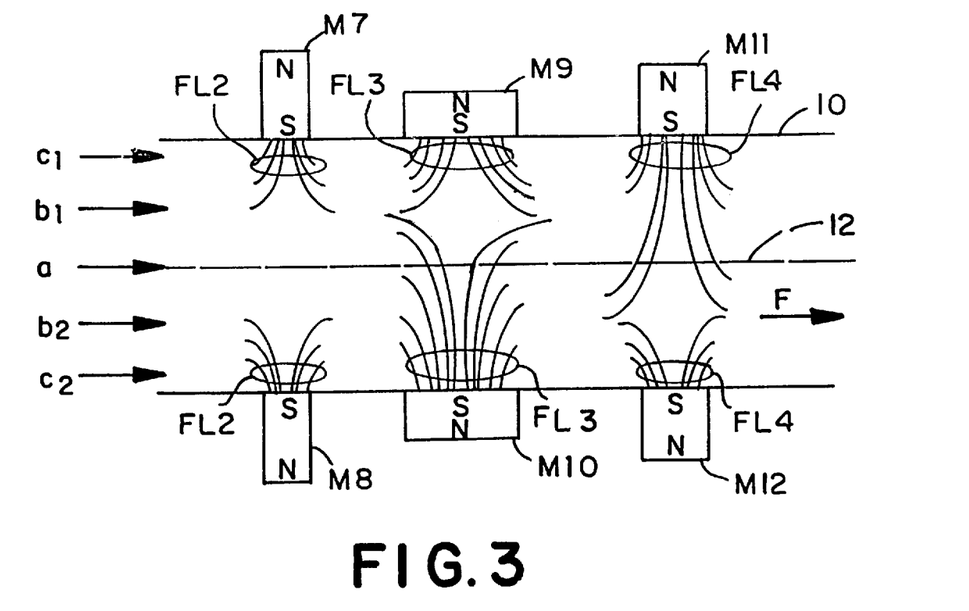
FIG. 3 illustrates a second embodiment of a like pole magnetic treatment device according to the present invention in a schematic sideview.

Turning now to a further embodiment according to FIG. 3, therein is depicted a yet further embodiment which falls within the scope of the present invention. Therein are depicted three sets of magnets, a first set M7 and M8, a second set M9 and M10, and a third set M11 and M12. Each of the sets of magnets are positioned peripherally relative to the exterior of the conduit (10) which has a center axis (12). Each of the sets of magnets are mounted in a coplanar manner and each plane is perpendicular to the center axis (12). Whereas in FIG. 2 the magnets were placed in physical contact abutting one another, this is not a requirement of the invention. FIG. 3 depicts wherein the sets of magnets may be placed in a spaced-apart relation. Also depicted on FIG. 3 is a schematic depiction of liquid flow vectors a, b1, b2, c1, and c2. In accordance with the embodiment on FIG. 3, two of the three sets of magnets are comprised of at least two magnets having different magnetic strengths. As is depicted on FIG. 3, the flux lines extending from magnets M7 and M8 are of equal strength and do not substantially penetrate into the center axis region of the conduit (10). With respect to the flux lines inserted by magnets M9 and M10, in this set the magnet M10 is of a higher strength than its corresponding magnet M9 and the flux lines (FL3) of the magnetic field imparted are displaced with respect to the center axis of the conduit such that magnetic field imparted by magnet M10 on the flowing fluid exerts beyond the center axis (12) and towards magnet M9. With respect now to the third set of magnets, as may be seen from FIG. 3, the flux lines (FL4) emanating from magnet M11 are substantially stronger than the flux lines emanating from magnet M12 as depicted on the figure. Conversely to the flux direction of magnets M9, M10 and the present magnet set that make a field imparted by magnet M11 extend beyond the center axis (12) of the conduit (10) in the direction of magnet M12. As has been described previously, as can be seen from FIG. 3, each of the regions of fluid flow, as represented by flow vectors a, b1, b2, c1 and c2 each pass through a magnetic field and thereby are imparted with magnetic conditioning. It is to be understood that the invention requires only two sets of magnets, at least one set of which has at least two magnets of dissimilar magnetic strength.

Figure 4:
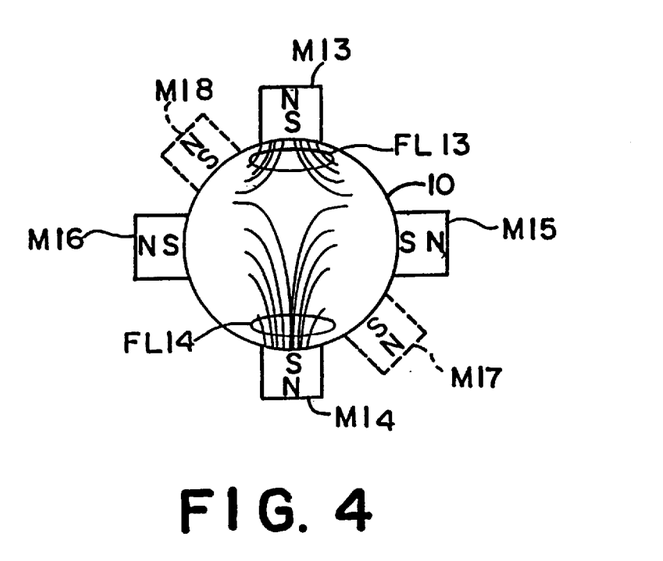
FIG. 4 illustrates an end view of a further embodiment of a like pole magnetic treatment device according to the present invention.

With respect now to FIG. 4, there is depicted a cross sectional illustration of a still further embodiment of the invention. Therein are depicted at least two magnet pairs M13 and M14, and the second pair M15 and M16. A third magnet pair M17 and M18 is also depicted by a dotted line representation. FIG. 4 illustrates the possibility that the arrangements of pairs of magnets may have different radial spacings, and also illustrates the non-symmetrical magnetic flux profile of a magnet set which is non-symmetrical with respect to the center axis of the conduit. In the figure, the arrangement of the first pair and the second pair of magnets are at approximately 90° radial offset with respect to one another. The relative radial spacing of the first pair and third pair of magnets are at a radial offset of greater than 90° and less than 180° with respect to one another. Such merely illustrates the point that it is understood that the present inventive scope is not to be limited by any specific radial arrangements of the sets of magnets with respect to one another, nor is it required that the magnets from different magnet sets abut one another as in FIG. 2, but may be spaced apart as in FIG. 3. Various further combinations such as having two sets of magnets abut one another and a third set of magnets, (as well as any further sets of magnets) spaced apart from the first and second magnet sets are also contemplated. Also, although FIGS. 2 and 3 have illustrated respectively two and three sets of magnets having two magnets each, it is contemplated that a greater number of magnet sets, as well as a greater number of magnets within each set, operating according to the general inventive principles as described herein, are also expressly contemplated to be within the present inventive scope.

Further with respect to FIG. 4 therein is illustrated a magnet set which exerts a magnetic flux profile in the said common plane of the magnet set which is non-symmetrical with respect to the center axis of the conduit. Therein, M13 and M14 are peripherally mounted on the exterior wall of the conduit (10) on a common plane with like ('south' poles) being inwardly directed. It is to be understood that M13 and M14 have dissimilar magnetic strengths, with M13 having a weaker magnetic strength than M14. As may be seen, at the cross section of the conduit (10) in the plane where M13 and M14 are mounted, the flux lines (FL14) from M14 extend from the conduit wall relatively further than the flux lines (FL13) extending from M13. In such a cross-sectional view, it is seen then that the magnetic flux profile as represented by FL14 and FL13 in the said common plane of the magnet set M14 and M13 provides a magnetic flux profile which is non-symmetrical with respect to the center axis of the conduit.

Figure 4A:
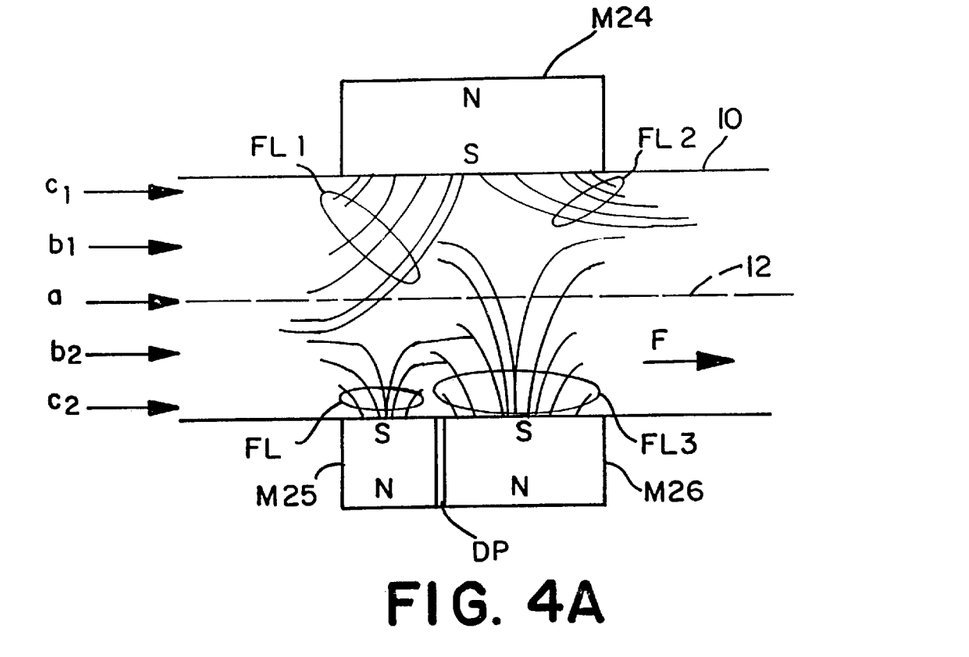
FIG. 4A illustrates a side view of a further embodiment of a like pole magnetic treatment device according to the present invention

Turning now to FIG. 4A therein is illustrated a side view of a further embodiment of a like pole magnetic treatment device according to the present invention. Therein, M24 is a first magnet peripherally mounted about the exterior of the conduit (10), and transverse to M24 is a set of magnets M25 and M26 abutting each other, and also peripherally mounted about the exterior of the conduit (10). In the figure, magnet M24 and M26 are of the same magnetic strength, while magnets M24 and M26 are of unlike magnetic strengths. As shown in FIG. 4A, the flux lines (FL) emanating from magnet M25 and the flux lines (FL1) of the downstream part of M24 are symmetrical about the center axis (12). However, the magnetic flux lines (FL2) emanating from the upstream part of M24 and the magnetic flux lines (FL3) emanating from magnet M26 are non-symmetrical about the center axis (12). This embodiment illustrates that the present invention may also be practiced wherein set of magnets share a common magnet, i.e., M24 and M25 define a first set of magnets, and M24 and M25 define a second set of magnets. In each of the magnets of FIG. 4A, like poles, "south" poles are directed towards the interior of the conduit (10). Also depicted in the figure is the use of a divider plate (DP) which is formed of a ferrous material (i.e., steel, iron, ferrous metal alloys) which is used to aid in the manufacture of the magnet assembly which includes M25 and M26. It will be recognized by the skilled practitioner that it may be difficult, due to opposing magnetic fields of the same or 'like' polarity, to assemble magnets M25 and M26 in a physically abutting relationship as they would tend to physically repel one another. This problem may be overcome by providing a divider plate which may be attracted to a magnet; as shown in the FIG. 4A, magnets M25 and M26 are attracted to opposite sides of the divider plate (DP). Such a technique has no detrimental effect upon the invention being taught herein. Further such a technique may be used to assemble other arrangements of magnets which may be used to practice the present inventive concept, particularly as described in this specification and accompanying drawings. It is also to be understood that the magnets M24, M25 and M26 may be of dissimilar magnetic strengths.

Figure 4B:
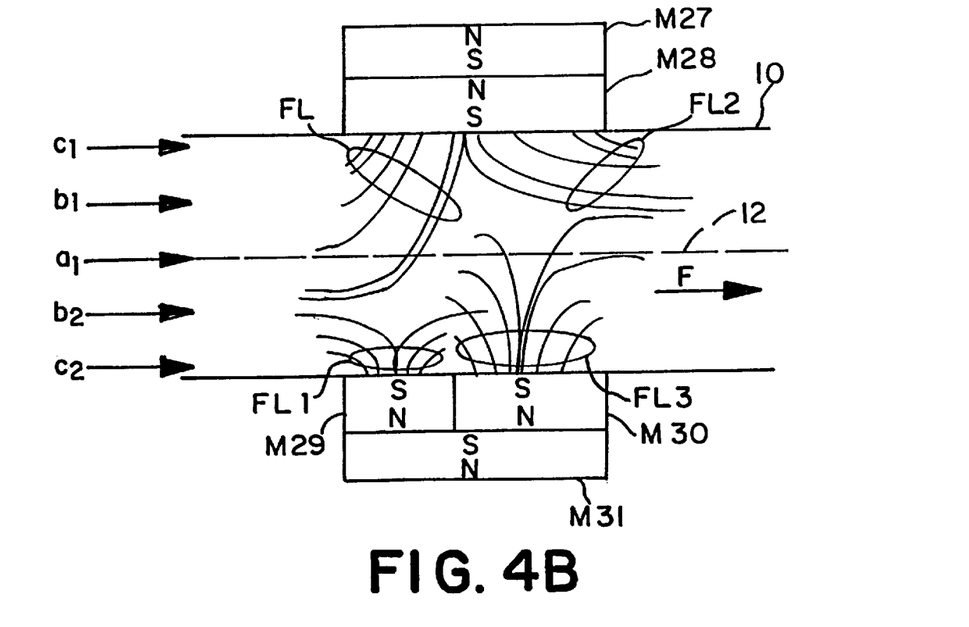
FIG. 4B illustrates a side view of a further embodiment of like pole magnetic treatment device according to the present invention.

FIG. 4B illustrates a side view of a further embodiment of like pole magnetic treatment device according to the present invention, which illustrates a further variation of the invention wherein magnets are 'stacked' or layered in register and/or abutting one another are used. In the figure, M27 and M28 depict two magnets which are layered in register, and wherein the face of M28 is mounted peripherally about the exterior of the conduit (10). Magnets M29 and M30 depict two magnets which abut each other, each of which is mounted peripherally about the exterior of the conduit (10); a further magnet M31 is layered in register on M29 and M30. In each of the magnets of FIG. 4B, like poles, "south" poles are directed towards the interior of the conduit (10). Herein, this embodiment illustrates that the present invention may also be practiced wherein each set of magnets share a common magnet, i.e., the combination of M27 and M28 together. In this figure, the first set of magnets is the combination of M27 and M28 together, with the further combination of magnets M29 and M31. The second set of magnets is the combination of M27 and M28 together, with the further combination of magnets M30 and M31. It is to be understood that M27 and M28, a first compound magnet is stronger than the second compound magnet, M29 and M31. This is illustrated by the stronger magnetic flux lines (FL) emanating from M27 and M28, as opposed to the relatively weaker magnetic flux lines (FL1) emanating from M29 and M31. It is further to be understood that M30 and M31 are a third compound magnet which is stronger than the first compound magnet (M27 with M28), as is depicted by the magnetic flux lines (FL3) as opposed to the relatively weaker magnetic flux lines (FL2) shown in FIG. 4B. (While omitted in it's construction, M29 and M30 may include a divider plate therebetween, as discussed with reference to FIG. 4A.)

The embodiments of FIG. 4A and 4B illustrate that various combinations of magnets may be possible and are to be considered within the scope of the invention, it being required only that there be at least two sets of magnets having like poles directed towards the interior of the conduit, wherein each set of magnets is mounted in a plane which is transverse to the direction of fluid flow, wherein the at least one set of magnets includes at least two magnets which have different magnetic strengths. Each of the magnets within each of the at least two sets may be a single magnet such as shown in FIG. 1, i.e., M3, M4, or may be a plurality of magnets or "compound" magnets such as shown in FIGS. 4A and 4B; it is only required that the fluid flowing through the conduit pass through a magnetic field wherein the flux lines of the magnetic field are non-symmetrical with respect to the longitudinal or center axis of the conduit or pipe. Such are conveniently produced by the use of at least two sets of magnets, which generate two unlike magnetic fields.

With regard to the construction of the apparatus according to the present invention, any means which are suited for peripherally arranging each of the sets of magnets with respect to the conduit (10) as described above may be used. The magnets need not physically contact the conduit, but this may be desirable with a ferromagnetic conduit such as an iron or steel pipe. These may include appropriate mechanical means such as clamps, brackets, bands, straps, housing devices having spaces for retaining the magnets therein, as well as chemical means such as adhering the magnets to the exterior wall of the conduit (10). Any suitable means including any of the means or devices which may have been described in any of the U.S. patents mentioned above which are here incorporated by reference, may be used. In further embodiments, it is also contemplated that the sets of magnets be an integral part of the conduit such as being included in the construction of the wall of the conduit as well. The sets of magnets may also be placed on the interior wall of the conduit. It is also contemplated that the sets of magnets use to practice the invention may form an integral part of the wall of a conduit. In such an arrangement, there may be provided a conduit section with flanges, threads or other means of attachment which may be used to insert said conduit section in-line with the conduit within which flows a fluid. Such a conduit section would include magnets in an arrangement in accordance with the present inventive concepts taught herein, included in or as part of the wall of the conduit section.

The magnets may be constructed of any appropriate material and may, for example, be permanent magnets or electromagnets as known to the art or which may hereinafter be developed. When the magnets are permanent magnets, especially suitable magnetic materials include ceramics, and rare earth materials, which particularly include neodymium-iron-boron magnets as well as samarium-cobalt type magnets. With the case of electromagnets, it will be apparent that these should be attached to an appropriate electrical source so that their electromagnetic properties are maintained. The physical form of the magnets may be of any appropriate form and it is only preferred in the arrangements of the apparatus described herein, that common or 'like' poles (either both 'north' but preferably both 'south') of each magnet are directed inwardly towards the center axis of the conduit. This is due to the fact as this has been observed to be particularly beneficial in the magnetic treatment of fluids, but it is also realized that under certain conditions it may be more appropriate that the opposite or "north" poles of the magnet should be inwardly directed, that this may be appropriately done and still fall within the general scope of the instant invention.

Figure 5:
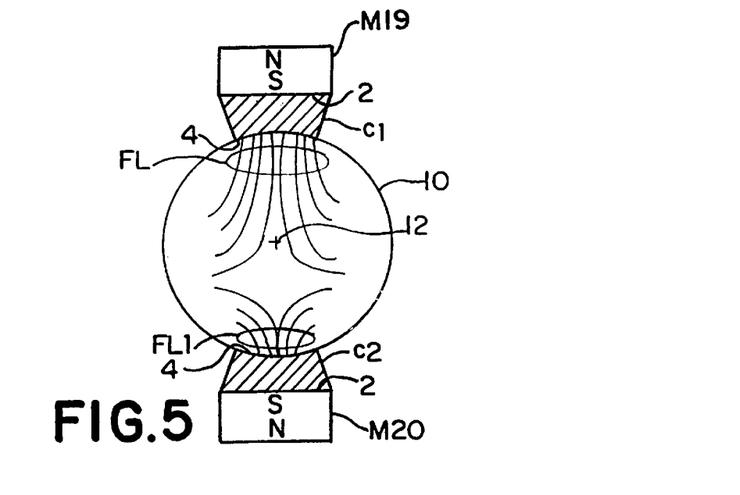
FIG. 5 illustrates a cross sectional view of an embodiment of the invention wherein a combination of magnets with concentrator element is used.

It is also to be understood that magnets which have been described above with reference to the invention may be magnets, as well as any combination of a magnet and one or more elements which may act to improve the penetration of the magnetic field into the conduit, or which condenses the field strength of the magnet. These include the use of one or more pole pieces formed of iron or steel, especially low carbon content cold rolled steel. Such a pole piece is preferably positioned intermediate one face or one pole of a magnet, and the exterior wall of a conduit. Desirably the portion of the pole piece in contact with the exterior wall of the conduit has a profile which approximates the profile of the exterior wall of the conduit so that the pole piece may be mounted onto the conduit. Typically, the portion of the pole piece in contact with the exterior wall has an arcuate profile which corresponds to the exterior radius of a conduit, especially a pipe. Where the conduit has a flat surface (such as for conduit having a square, triangular or rectangular shaped cross section) the portion of the pole piece in contact with the exterior wall may be a flat profile. The pieces may be arranged on any side of any of the magnets, such as intermediate the magnet and the outer wall of the conduit, in contact with at least a part of a magnet and at the same time perpendicular to exterior wall of the conduit. The pole piece may also be tapered such that the face of the pole piece which is in contact with the magnet is equal to or greater than the surface area of the side of the magnet which it contacts, but on its opposite face, the pole piece has a lesser surface area. In such an arrangement the pole piece is provided with a tapered configuration which acts to concentrate the magnetic field at the interface of the magnet with pole piece, to the smaller area at the opposite face of the pole piece which is at or near the exterior wall of the pipe. Such is illustrated in FIG. 5 wherein is shown in a cross-sectional view a conduit (10) having an inner wall and an outer wall, two magnets M19, and transversely positioned M20. Magnets M19 and M20 are of different strengths, with M20 being relatively weaker than M19. Intermediate each respective magnet are concentrator elements C1, C2, each of which has a face 2 in contact with one pole ('south') of a magnet, and an opposite face 4 which has a profile which approximates the profile of the exterior wall of the conduit. As may be seen from FIG. 5, each concentrator element C1, C2 decreases in cross sectional area as it extends from the face in contact with its respective magnet to where it contacts the exterior wall of the conduit. The resultant flux lines, FL and FL1 respectively emanating from magnets M19 and M20 are also shown.

Figure 6:
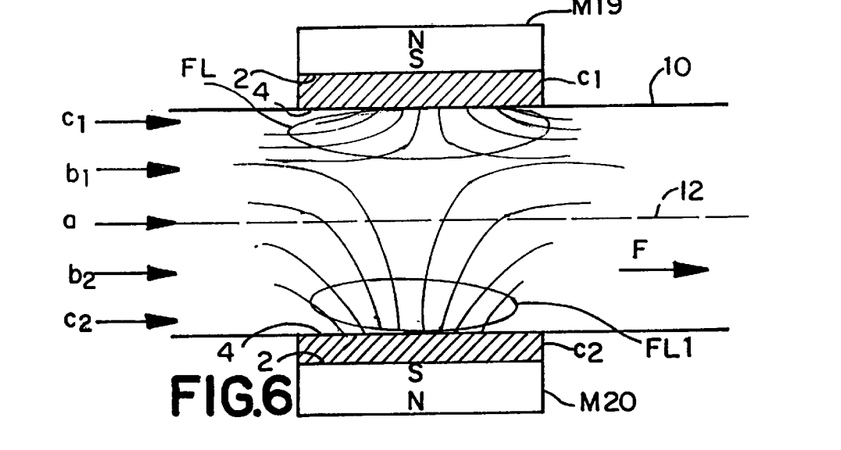
FIG. 6 illustrates a side view of the embodiment of the invention shown on FIG. 5 wherein a combination of magnets with backplate elements are used.

FIG. 6 illustrates a side view of the embodiment of the invention shown on FIG. 5 wherein a combination of magnets with concentrator elements are used.

The construction of any of the pole pieces and magnets which illustrated in any of U.S. Pat. Nos. 5,227,683, 5,269,915, 5,269,916, and U.S. Pat. No. 5,366,623 may be used in the apparatus according to the present invention. The use of such concentrators in conjunction with permanent magnets in the present invention allows for the use of relatively low strength magnets which may have their effective strength boosted by the use of one or more of the devices shown in these U.S. Patents, the contents of which are herein incorporated by reference. In apparatus according to the invention, all of the magnets, but not necessarily all of the magnets present in an apparatus may be provided with such concentrators. Alternatively, it is contemplated that magnets of the same strength may be used, but that their relative strength may be modified by providing at least one (or more) of the magnets with a concentrator so that that such magnet's effective strength is relatively increased.

Figure 7:
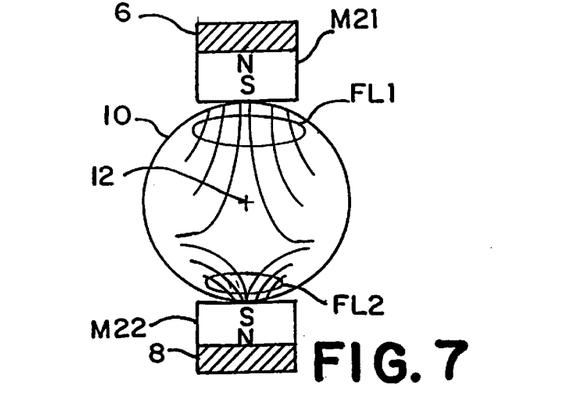
FIG. 7 illustrates a cross sectional view of an embodiment of the invention wherein a combination of magnets with backplate elements are used.
Figure 8:
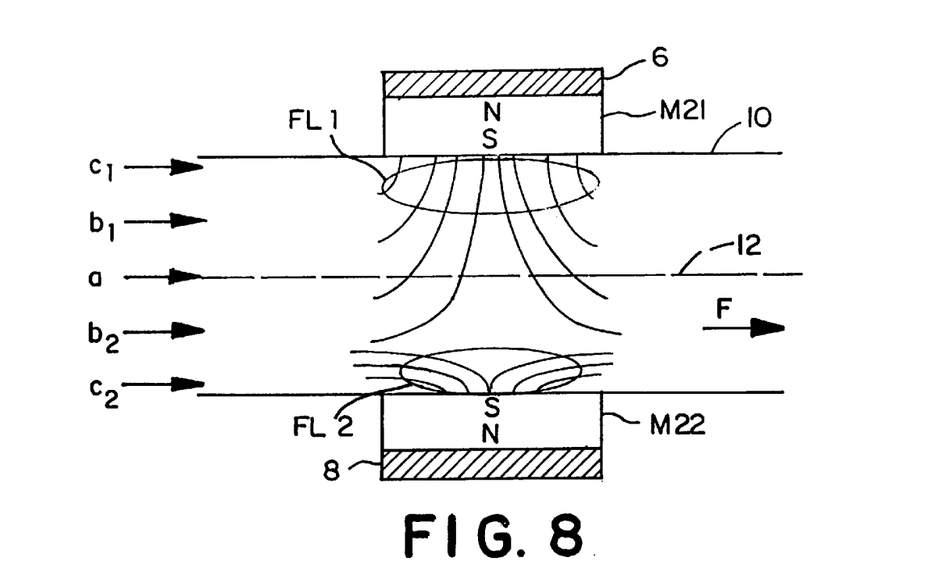
FIG. 8 illustrates a side view of an embodiment of the invention shown in FIG. 7 wherein a combination of magnets with backplate elements are used.

It is further contemplated that any of the magnets may be a magnet and a backplate which acts to improve the penetration of the magnetic field into the conduit. Such a backplate may be formed of any suitable material (i.e., iron, steel, or other ferrous material or alloy) which is useful in forming a pole piece as described above. Such an arrangement is illustrated on FIG. 7. Therein is shown in a cross-sectional view a conduit (10) having an inner wall and an outer wall, two magnets M21, and transversely positioned M22. These magnets are arranged such that one side of each contacts the outer wall of the conduit (10), with the same poles, or "like poles" (either both 'north' but preferably both 'south') of each magnet facing the interior of the conduit (10). On the side of each magnet opposite the side facing the interior of the conduit are backplate elements 6 which is in contact with the magnet. FIG. 8 illustrates a side view of the embodiment of the invention shown in FIG. 7 wherein a combination of magnets with backplate elements are used. In both figures, the combination of M21 with backplate 6 has a stronger magnetic field strength than the combination of magnet M22 with backplate 8, as demonstrated by the respective magnetic flux lines FL1 and FL2 emanating therefrom.

It is to be understood that various different arrangements of magnets may also advantageously be used with any of the pole pieces and/or back plates as described above. It is also to be understood that in an apparatus according to the invention, some or all of magnets present in an apparatus may be provided with such backplates. It may be Various arrangements of magnets used with pole pieces and/or back plates are illustrated on FIGS. 7, 8, 9, 10 and 11.

It will be appreciated by the skilled practitioner in the art that the magnets in each set of magnets described with reference to the invention need not necessarily be of different magnetic strengths, but may be of similar or like strength; it is only necessary that the apparatus according to the invention generate a magnetic field directed into the interior of the pipe or conduit, wherein the flux lines of the magnetic field are non-symmetrical with respect to the longitudinal or center axis of the conduit or pipe. Such may be achieved such as by using two or more magnets of like or similar strength, in conjunction with pole pieces and/or back plates associated with at least one of said magnets whereby the magnetic strength of the magnet used with pole pieces and/or back plates is increased or decreased with respect to the remaining magnets, such that the resulting flux lines of the magnetic field produced by the said two or more magnets are non-symmetrical with respect to the longitudinal or center axis of the conduit or pipe.

Figure 9:
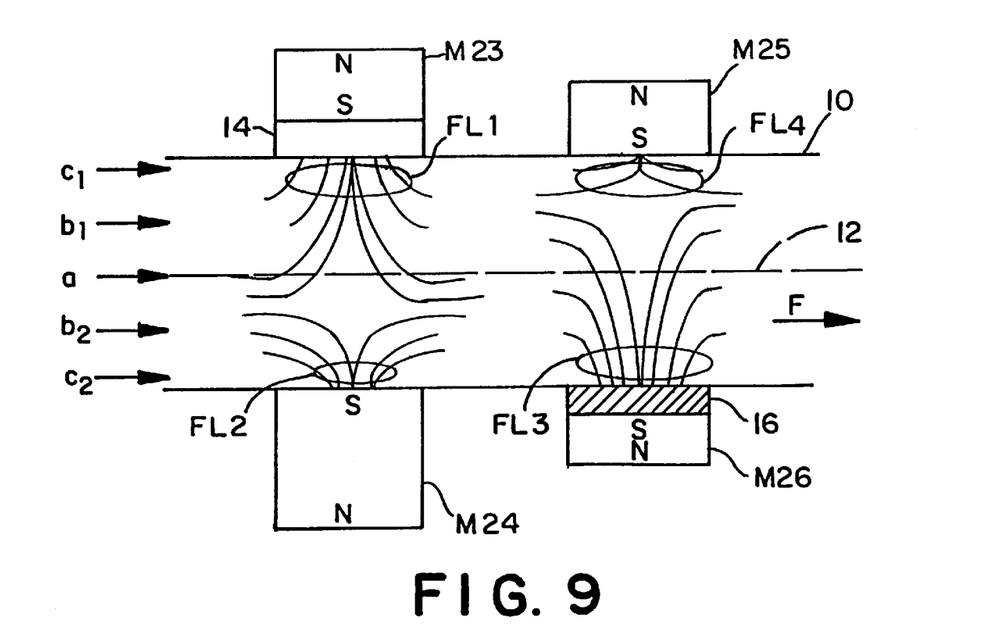
FIG. 9 illustrates a side view of an embodiment of the invention wherein a combination of magnets with concentrator elements are used.

As is depicted on FIG. 9, a conduit (10) having a center axis (12) includes two sets of magnets, a first set M23 and M24, and a second set M25 and M26; each magnet has its south pole directed towards the interior, i.e., center axis of the conduit. It is to be understood that the magnets are of equal strength, but the effective strength of magnet M23 is increased by its use in conjunction with a pole piece (14) intermediate itself and the conduit (10). Such provides a first set of magnets wherein the effective strength of magnet M23, used in conjunction with pole piece (14) is greater than the strength of magnet M24; the respective flux lines (FL1) and (FL2) are also illustrated. A similar arrangement is shown with respect to the combination of magnet M26 with pole piece (16) which has a greater effective strength than magnet M25; the respective flux lines (FL3) and (FL4) are also shown.

Figure 10:
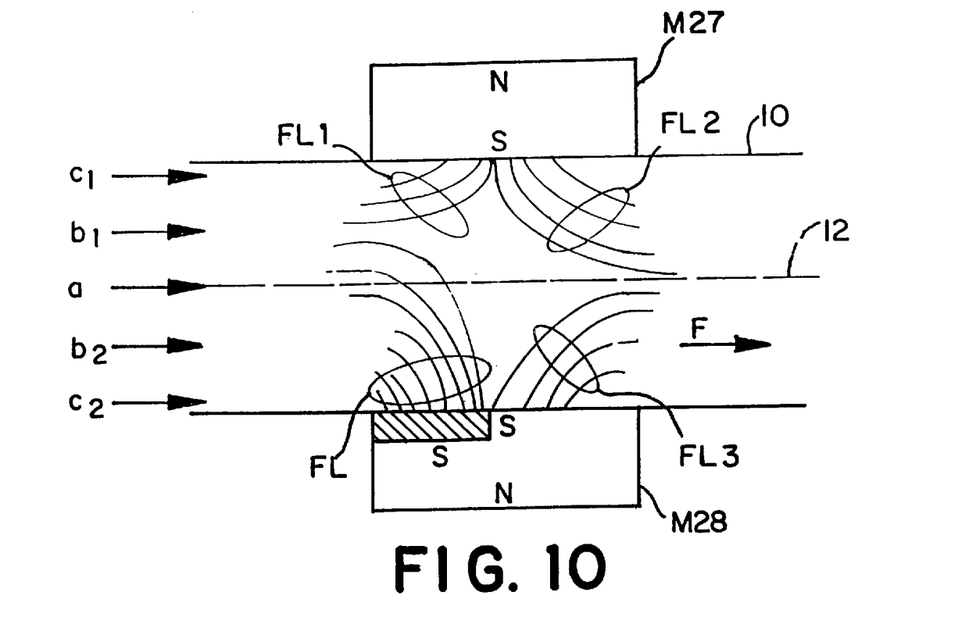
FIG. 10 illustrates a side view of an embodiment of the invention wherein a combination of magnets with concentrator elements are used.

In a further embodiment of the invention wherein two magnets are used, as shown on FIG. 10, there is a conduit (10) having a center axis (12), with two magnets M27 and M28 mounted on the periphery of the conduit. Each of magnets M27 and M28 are of equal magnetic strength, and each is mounted with its south pole directed to the interior, i.e., center axis of the conduit. Further, part of magnet M28 includes a pole piece (16) which is positioned between the conduit (10) and part of magnet M28. In this arrangement part of the magnet M28 has it effective strength increased to an amount greater than magnet M27 due to the presence of the pole piece (16); the remaining part of magnet M28 has an effective strength equal to that of magnet M27. In such an arrangement, the flux lines of the magnetic fields induced into the conduit (10) are non-symmetrical with respect to the longitudinal or center axis (12) of the conduit or pipe.

Figure 11:
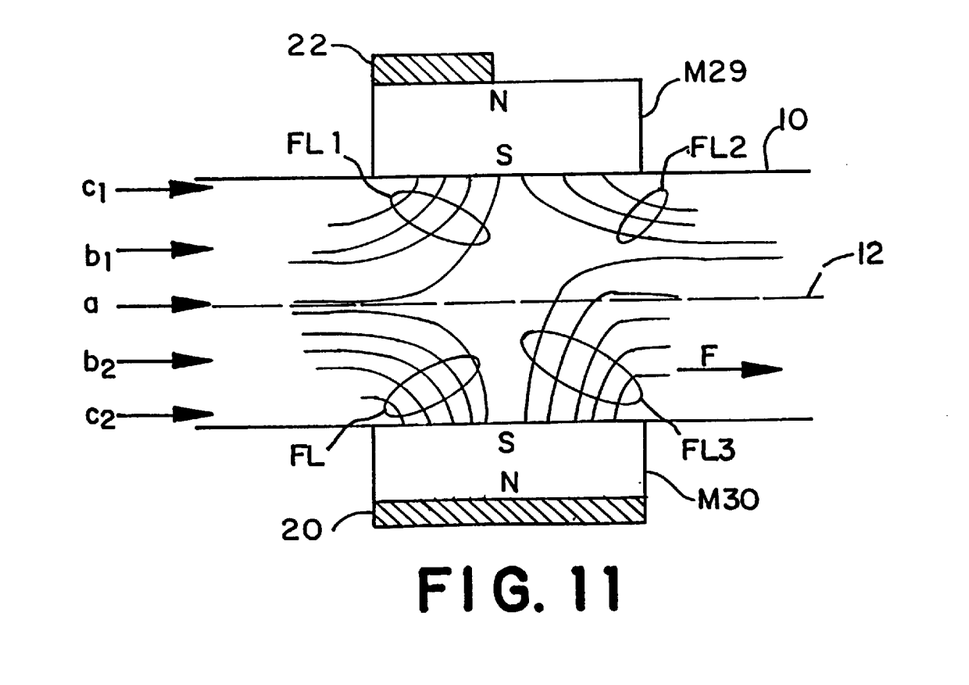
FIG. 11 illustrates a side view of an embodiment of the invention wherein a combination of magnets with backplate elements are used.

An alternate arrangement of an apparatus according to the invention which illustrates a further inventive embodiment utilizing two magnets, as shown on FIG. 11 there is a conduit (10) having a center axis (12), with two magnets M29 and M30 mounted on the periphery of the conduit. Each of magnets M29 and M30 are of equal magnetic strength, and each is mounted with its south pole directed to the interior, i.e., center axis of the conduit. Mounted on the back face of magnet M30 is a backplate 20 and a similar, but smaller backplate 22 is mounted on the back face of magnet M29. The arrangement of the respective magnets and backplates (M29 and 22; M30 and 20) with respect to each other is such that backplates 22 and 20 are parallel but opposite to each other. However, as backplate 22 is smaller than backplate 20, its effect on its associated magnet M29 is effective only over a smaller area than that of backplate 20, which is larger, covers a larger part of its associated magnet M30 and thus has a more pronounced effect on its associated magnet. In such an arrangement as shown in FIG. 11, the resulting flux lines of the magnetic fields induced into the conduit (10) are non-symmetrical with respect to the longitudinal or center axis (12) of the conduit or pipe.

In the embodiments utilizing backplates and/or condensers it is understood that the operating characteristics of such elements may be judiciously selected to provide an ultimately desired effect upon the magnetic strength, and on the magnetic field on the magnet (or magnets) with which it is associated. For example, it is contemplated that for example, the arrangement shown on FIGS. 7 and 8 may be used wherein the magnets M21 and M22 may be of equal strength, and the complementary backplates (6) (8) are of identical physical size, but they are made of different materials such that they provide a different effect on their respective associated magnets, such that the resulting flux lines of the magnetic fields induced into the conduit (10) are non-symmetrical with respect to the longitudinal or center axis (12) of the conduit or pipe. Alternately the complementary backplates (6) (8) may be made of the same material, but are of different physical sizes or of different physical configuration, such that they provide a different effect on their respective associated magnets, whereby the resulting flux lines of the magnetic fields induced into the conduit (10) are non-symmetrical with respect to the longitudinal or center axis (12) of the conduit or pipe. Such variations described immediately above are to be understood by way of illustration, but not by limitation and to suggest that further arrangements of magnets, backplates and condensers may be used and still fall within the general inventive teaching being disclosed herein.

It is also contemplated that other elements which are effective in improving or modifying the effective strength of magnets may also be used in conjunction with the present invention, and still fall within the scope of the invention. An exemplary element is a thin metal or metallic foil which is placed intermediate a face of a magnet and the face or wall of a conduit; the presence of the thin metal or metallic foil is found to improve the operation of the magnet with which it is associated. Such is for example, is presently commercially available in Japan from H.M. International Co., Ltd. Kanda Wing Hatano Bldg., 2–4 Kanda-Awajicho, Chiyoda-ku, Tokyo 101 Japan as a "Neojikun" device.

Embodiments such as those described above may be desirable where low cost magnets (ceramic) are used, as their apparent magnetic strength is increased by the use of pole pieces and/or back plates.

Figure 12:
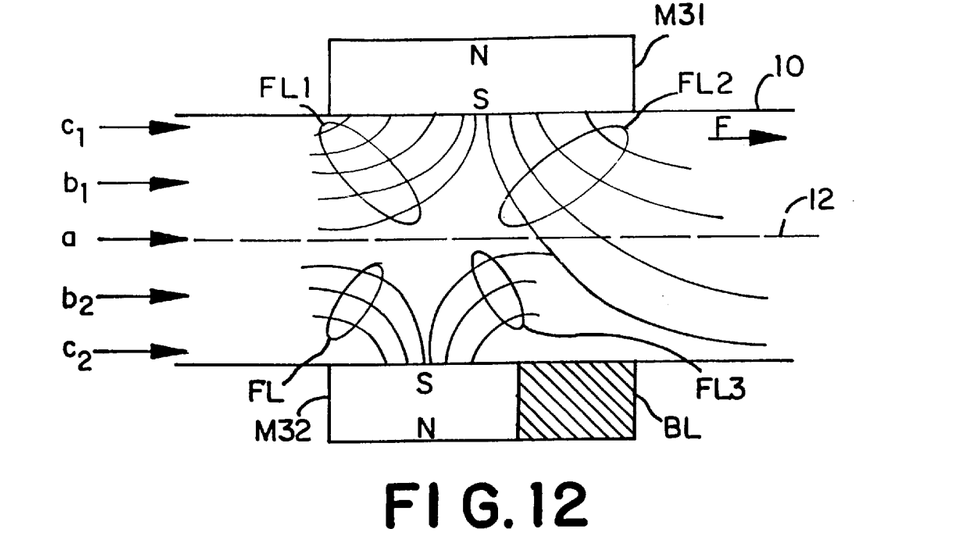
FIG. 12 illustrates a side view of an embodiment of the invention wherein a non-magnetic element is used in the apparatus of the invention.

In a still further embodiment of the invention, there is provided an apparatus which includes two or more magnets that have like poles directed into the interior of the pipe or conduit, wherein the two or more magnets introduce a magnetic field into the interior of the pipe or conduit, wherein the flux lines of the magnetic field are non-symmetrical with respect to the longitudinal or center axis of the conduit or pipe. In accordance with such an embodiment, non-ferrous elements are also present in the apparatus, where such non-ferrous elements are used to vary the magnetic field introduced into the interior of the pipe or conduit. One such embodiment is shown on FIG. 12, wherein there is shown conduit (10) having a center axis (12), with two magnets M31 and M32 mounted on the periphery of the conduit. Each of magnets M31 and M32 are of equal magnetic strength, and each is mounted with its south pole directed to the interior, i.e., center axis of the conduit, however magnets M31 and M32 are of different physical sizes, such as of different physical lengths as shown. Abutting magnet M32 is a non-ferrous or non-premagnetized element (BL) which, may as shown in the figure, be of such length that together with magnet M32 these elements have a combined length approximately equal to that of magnet M31. The presence of the non-ferrous element in a position transverse to a magnet, here M31, causes the resultant magnetic field from the transversely mounted magnets M31 and M32 to be non-symmetrical with respect to the longitudinal or center axis of the conduit or pipe, and thus within the scope of the present inventive concept. This is due to the fact that the flux lines emanating from magnet M31 are not opposed in the region of the transversely (with respect to the conduit or its center axis) mounted non-ferrous element, to the extent that the flux lines emanating from magnet M32 are opposed in the region of the transversely mounted magnet M32. This results in a non-symmetrical magnetic field with respect to the center axis of the conduit, most particularly in the region of the non-ferrous element.

Figure 13:
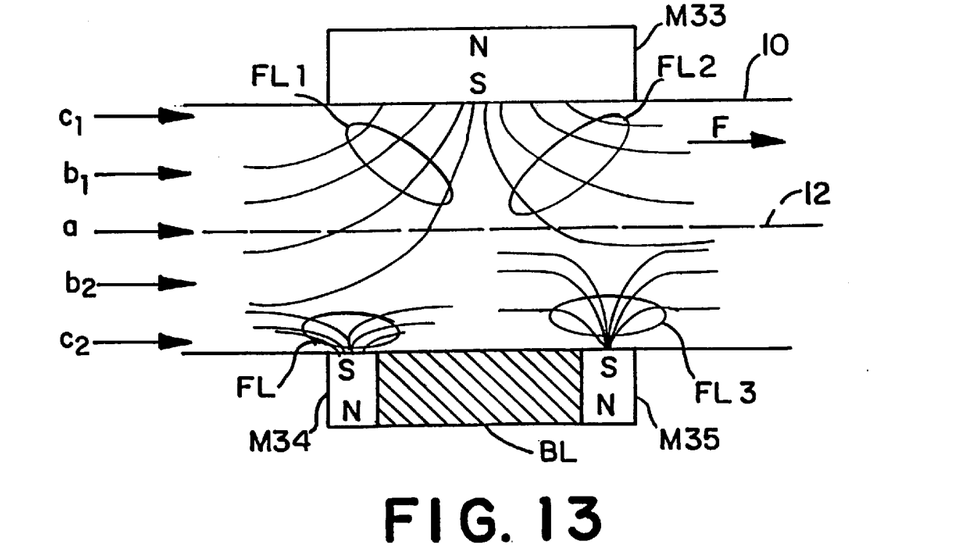
FIG. 13 illustrates a side view of an embodiment of the invention wherein a non-magnetic element is used in the apparatus of the invention.

A further embodiment wherein a non-magnetic (or non-premagnetized) element is utilized is shown on FIG. 13. Such a non-magnetic element may be formed of a non-ferrous material or be a ferrous material which is non-premagnetized. Therein is shown conduit (10) having a center axis (12), with three magnets, M33 mounted on the periphery of the conduit, and transversely mounted on the periphery of the conduit across from M33, two further magnets M34 and M35. Each of these three magnets may be of the same or of different magnetic strengths, and each is mounted with its south pole directed to the interior, i.e., center axis of the conduit. Magnets M35 and M35, as depicted, have positioned therebetween and abutting each a non-magnetic element (BL) which, may as shown in the figure, be of such length that together with magnets M34 and M35 have a combined length approximately equal to that of magnet M33, but the relative lengths may be different as described hereinafter. In FIG. 13, M34 and M35 are also of different magnetic strengths. The presence of the non-magnetic element in a position transverse to a magnet, causes the resultant magnetic field from the transversely mounted magnets to be non-symmetrical with respect to the longitudinal or center axis of the conduit or pipe, and thus fall within the scope of the present inventive concept.

The use of such non-magnetic elements, or non-premagnetized elements may be desired from a manufacturing standpoint, i.e., in facilitating the assembly of the apparatus. The use of such non-ferrous materials may be omitted as well in the arrangements described with reference to FIGS. 12 and 13, it being required only that the resultant magnetic field from the transversely mounted magnets to be non-symmetrical with respect to the longitudinal or center axis of the conduit or pipe, in order to come within the scope of the present inventive concept. It is to be understood however, that ferrous non-premagnetized materials at the time of the assembly have no appreciable magnetic charge, but which may over time become magnetized when assembled in contact or close proximity to one or more permanent magnets.

Figure 14:
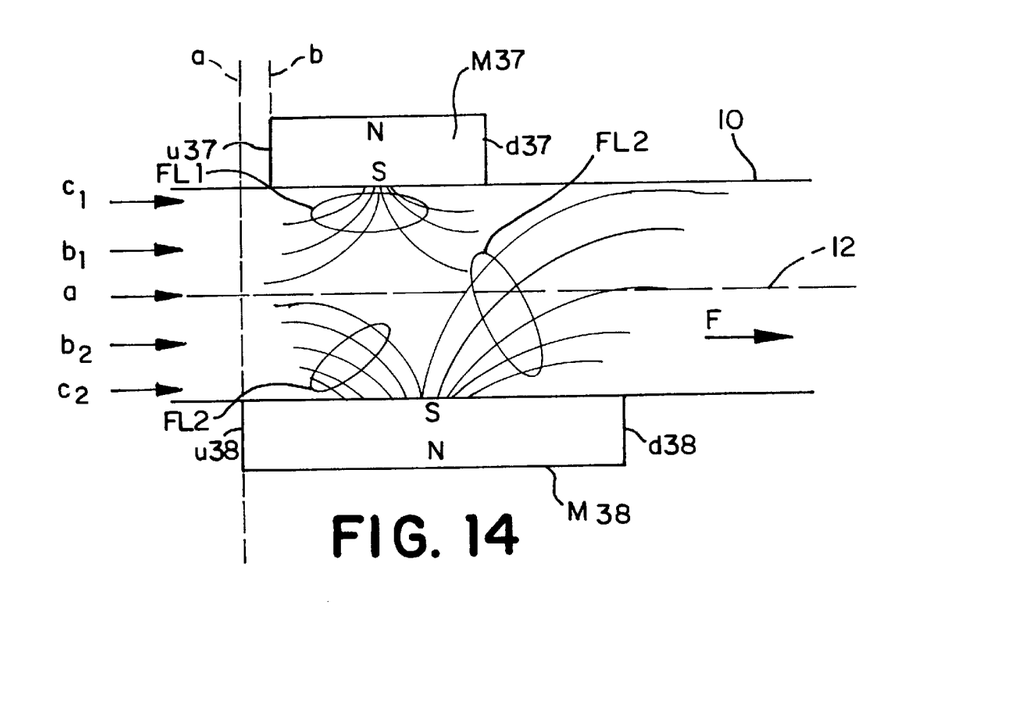
FIG. 14 illustrates a side view of an embodiment of the invention where wherein two magnets, of unequal lengths are used in the apparatus of the invention.

A still further embodiment of the invention wherein two magnets, of unequal lengths are used are illustrated on FIG. 14. Therein are depicted two magnets M37 and M38 mounted on the exterior of the conduit 10. As shown, these magnets are of unequal length with M37 being shorter than M38. The upstream end "u38" (with respect to the direction of fluid flow, indicated by the vector F) of M38 is coincident with the plane perpendicular to the direction of fluid flow as represented by the dotted line segment "a—a". The upstream end "u37" of magnet M37 is coincident with a second plane perpendicular to the direction of fluid flow as represented by the dotted line segment "b". Both magnets extend along the length of the conduit, with the downstream end "d37" of magnet M37 being closer to plane a-a than the downstream end "d38" of magnet M38. From the foregoing is seen that the magnets M37 and M38 may be mounted to occupy a common plane perpendicular to the direction of fluid flow, but due to the difference in lengths of M37 with respect to M38 a portion of M38 generates a non-symmetrical magnetic flux with respect to the longitudinal or center axis of the conduit or pipe. Such is shown by flux lines (FL2) which extend beyond the center line of the conduit (12). Such an arrangement is understood to come within the scope of the present inventive concept. It is to be understood that M37 and M38 may be of the same, or may be of dissimilar magnetic strengths.

Figure 15:
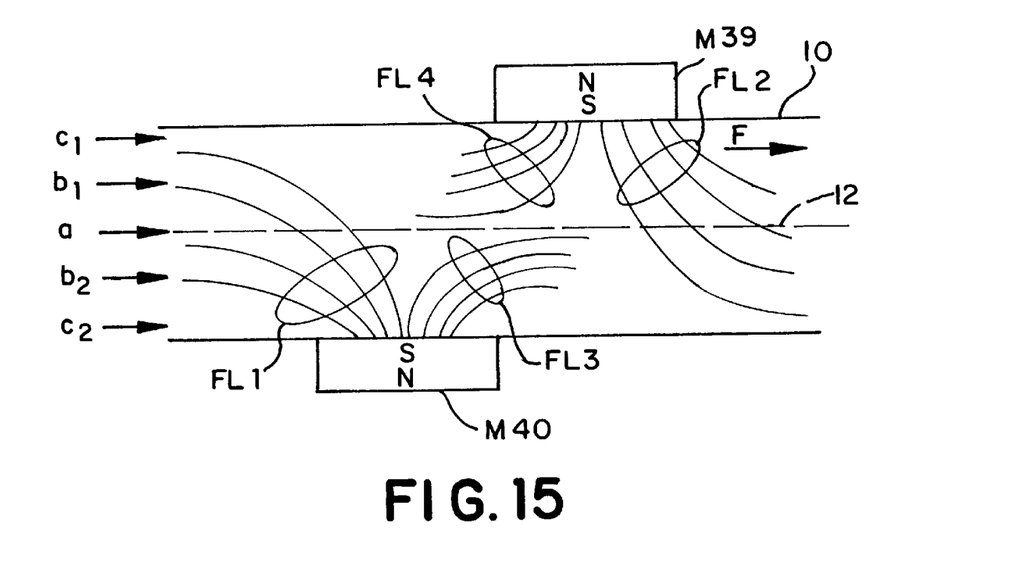
FIG. 15 illustrates a side view of an embodiment of the invention where wherein two magnets, of equal lengths but on an offset mounting arrangement are used in the apparatus of the invention.

FIG. 15 illustrates a side view of an embodiment of the invention where wherein two magnets, of equal lengths, but on an offset mounting arrangement are used in the apparatus of the invention. Therein, two magnets M39 and M40

(which may be of equal or different magnetic strengths) are mounted on the exterior of the conduit (10). As illustrated, these magnets are mounted on the periphery of the conduit (10) but do not share a common plane perpendicular to the direction of fluid flow. However, they are mounted sufficiently closely that at least some of the magnetic flux lines from each interact, namely deflect one another. This is illustrated in the figure by flux lines FL3 and FL4. However, the magnets M39 and M40 generate magnetic flux lines which are not repelled by an opposing magnet, respectively illustrated as FL2 and FL1, which form form at least one non-symmetrical magnetic field with respect to the longitudinal or center axis of the conduit or pipe. It is to be understood that M39 and M40 may be of the same, or may be of dissimilar magnetic strengths.

In accordance with the invention, within each set of magnets as described above, it is preferred that there are at least two magnets, or 'compound magnets' wherein the difference in their respective magnetic strength (such as measured by Gauss value, or "G Oe" values (Gauss multiplied by Oersted value) ) differ by at least 10%, preferably at least 20%, and most desirably at least 30% and more. In certain preferred embodiments the difference in the magnetic strength of a set of magnets may be on the order of at least 100% and even more. Such a difference in the relative magnetic strengths of the two or more magnets within each magnet set will provide the magnetic flux profiles as are depicted on FIGS. 2 and 3 described above. It is to be understood that when magnets with concentrator elements or where magnets with backplate elements are used, that the aforesaid different in magnetic strength refers the net effective magnetic strength provided by the combination of a magnet used in conjunction with a concentrator element or with a backplate element.

Whereas the description of the invention has been described with reference to two sets of magnets or with reference to three sets of magnets, it is to be understood that the beneficial effects of magnetic conditioning of the fluid flowing through the conduit is realized when even greater numbers of magnet sets (four, five, six, etc. magnet sets) are used in accordance with the invention. In such a case, these plural magnets set, each set of which contains two, three or more magnets, are most desirably arranged along the conduit so that there results plural and different non-symmetrical magnetic flux patterns along the length of and with respect to the center axis of the conduit, which plural and different non-symmetrical magnetic flux patterns are offset from the center axis of the conduit. In such an arrangement fluid flowing through the conduit is required to pass through a greater number of perpendicular or near-perpendicular magnetic flux lines and thus are imparted with more effective magnetic conditioning.

Whereas the description of the invention, especially the drawings appear to represent permanent magnets, it is to be understood that in certain embodiments it may be desired to utilize other magnetic sources in order to provide the non-symmetrical magnetic flux patterns as has been generally described herein. Any device which may be used to generate magnetic flux lines, and provide non-symmetrical magnetic flux patterns may be advantageously used. By way of non-limiting examples these may be electromagnets.

Also, the description of the invention, especially the drawings may appear to represent single permanent magnets, these may in fact also be two or more magnets in a 'stacked' or "side-by-side" arrangement which when assembled form a magnet. In such an arrangement, it is to be understood that the two or more magnets are joined in a 'side-by-side' arrangement which is approximately or essentially coplanar with the page of the figure of the invention. In this case, as properly represented in the figure, only that magnet which is visible in the view represented by the figure is depicted, and any other magnets joined in a 'side-by-side' arrangement would be understood to be behind the illustrated magnet in a figure.

The invention is advantageously used in any process for the prevention of, or the reduction in the deposition of materials such as those described above on the interior walls of conduits through which a flowing fluid (liquid or gas) passes. According to this process, the flowing fluid is imparted with a magnetic treatment by utilizing any of the embodiments which are described above. The invention is also particularly advantageously used in a process for the prevention of, or the reduction in the deposition of materials such as those described above on the surfaces of hydronic equipment, including but not limited to heat exchangers, boilers and the like as described above. In such a process, an apparatus according to the invention is positioned upstream, that is to say in path of the flowing fluid prior to the entry of the fluid into the heat exchanger. The flowing fluid entering the heat exchanger is effectively conditioned so that scale, algae or corrosive deposits are prevented or reduced as compared to installations wherein an apparatus according to the invention is not used.

The invention is also advantageously used for the treatment of hydrocarbon fuels being supplied to an internal combustion and jet engines as described above, as well as burners (such as may be found in furnaces, boilers, etc.). In such a process, an apparatus according to the invention is situated about the fuel supply pipe or conduit, upstream of the said engine or burner. The use of the invention in such a process reduces undesirable emissions from such engines, burners, etc.

The invention is also advantageously useful for the treatment of fluids used in horticultural applications, particularly in the treatment of water and or aqueous based fluids used in the cultivation of plants, particularly in hydroponic applications. The fluid used in such treatment is allowed to flow through a pipe or conduit which includes the apparatus according to the invention, wherein it is provided with magnetic conditioning. Thereafter the treated fluid is used in the horticultural application. It is found that freshly cut flowers and other plants appear to remain fresher for a longer period as a result of being watered or treated with fluids conditioned as described above. The use of the invention for the treatment of water or other aqueous based fluids used in the cultivation of plants is believed to improve the growth characteristics of such plants.

The invention is also advantageously useful in the treatment, reduction or eradication of undesirable microorganisms, such as *Escheichia coli*, bacteria and algae in an aqueous fluid stream. In such a treatment process, an apparatus according to the invention is used to treat an aqueous fluid wherein undesirable microorganisms and/or algae are present or where their presence is suspected. Such an effect is described in U.S. Pat. No. 5,024,759 to McGrath, the contents of which are herein incorporated by reference.

It is to be understood that while the description of the invention generally has referred to the treatment of liquids flowing through a conduit, it is contemplated that gases may also be beneficially treated by the apparatus and processes which are disclosed herein. In such an event, the term "liquid" as described above and later referred to in the claims is to be understood to encompass both "liquid" and "gases" which may referred to as "fluids".

It is further to be understood that while the description of the invention has generally referred to an orientation of magnets wherein the south "S" pole of each magnet is directed inwardly, the principles of the invention apply equally wherein the orientation of each of the magnets is reversed, such that the north "N" pole of each magnet is directed inwardly with respect to the conduit. It is only required that there be a 'like' pole orientation of the magnets in at least one of the magnet sets in the apparatus according to the invention. It is also to be understood that in FIG. 1–15, the depictions of the various magnets by different sizes are not be necessarily representative of relative magnetic strength.

It is also to be understood that while the figures presented herein have discussed embodiments of the invention wherein a conduit (10) of a circular cross section and which is symmetrical about center axis (12) have been discussed, the invention may also be advantageously used with conduits having configurations which are non-circular in cross section.

While described in terms of the presently preferred embodiments, it is to be understood that the present disclosure is to be interpreted as by way of illustration, and not by way of limitation, and that various modifications and alterations apparent to one skilled in the art may be made without departing from the scope and spirit of the present invention.

I claim:

1. An apparatus for the magnetic conditioning of a fluid flowing through a conduit which comprises at least two sets of magnets, each set of magnets having like poles oriented towards the interior of the conduit, each set of magnets mounted in a plane perpendicular to the direction of flow of the fluid and positioned about the exterior of the conduit, wherein at least one of the set of magnets includes at least two magnets which magnets have different magnetic strengths.

2. An apparatus according to claim 1 for the magnetic conditioning of fluid flowing through a conduit which comprises a third set of magnets, wherein said three sets of magnets have like poles oriented towards the interior of the conduit, each of said magnets mounted in a plane perpendicular to the flow of the fluid and positioned about the exterior of the conduit, wherein at least one set of the at least three sets of magnets includes at least two magnets which two magnets have different magnetic strengths.

3. An apparatus according to claim 1 wherein the difference in magnetic strength of the at least two magnets is at least 10%.

4. An apparatus according to claim 3 wherein the difference in magnetic strength of the at least two magnets is at least 20%.

5. An apparatus according to claim 1 wherein at least one of the magnets of the apparatus further includes a ferrous pole piece.

6. An apparatus according to claim 1 wherein at least one of the magnets of the apparatus further includes a ferrous backplate.

7. An apparatus for the same pole magnetic treatment of flowing fluids in a conduit or pipe having a central longitudinal axis, wherein the apparatus comprises at least two magnets radially mounted at or near the circumference of the conduit or pipe, wherein the two or more magnets have like poles directed into the interior of the pipe or conduit, wherein the two or more magnets introduce a magnetic field into the interior of the pipe or conduit, wherein the flux lines of the magnetic field are non-symmetrical with respect to the central longitudinal axis of the conduit.

8. An apparatus for the magnetic conditioning of a fluid flowing through a conduit having a central longitudinal axis, comprising first and second magnetic elements positioned about the periphery of the conduit and having like poles oriented toward the interior of the conduit, wherein the strength of the magnetic field produced by the first magnetic element is different from the strength of the magnetic field produced by the second magnetic element, so that the flux lines of the magnetic fields of the first and second magnetic elements are non-symmetrical with respect to the central longitudinal axis of the conduit.

9. The apparatus of claim 8 wherein the first magnetic element comprises a ferrous element connected with a magnet.

10. The apparatus of claims 9 wherein the second magnetic element comprises a second ferrous element connected with a second magnet.

* * * * *